Feb. 25, 1969    J. C. BASS    3,429,203
HYDRAULIC REACTOR CONTROL DRUM DRIVE
Filed Sept. 20, 1965    Sheet 1 of 2
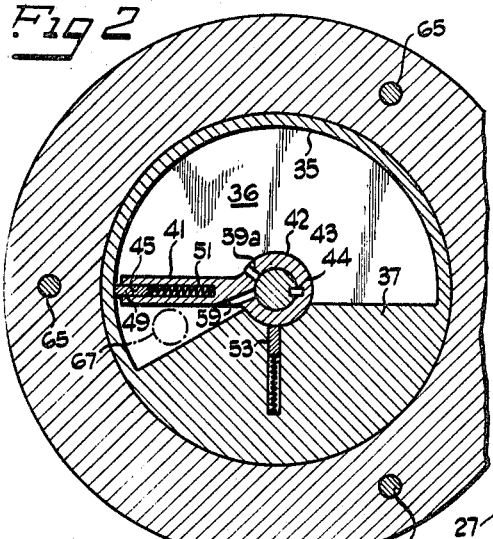
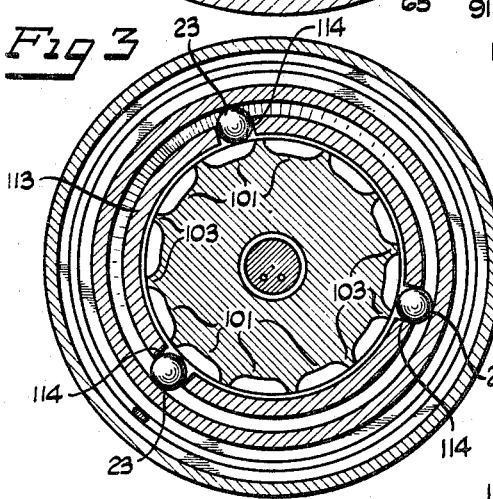
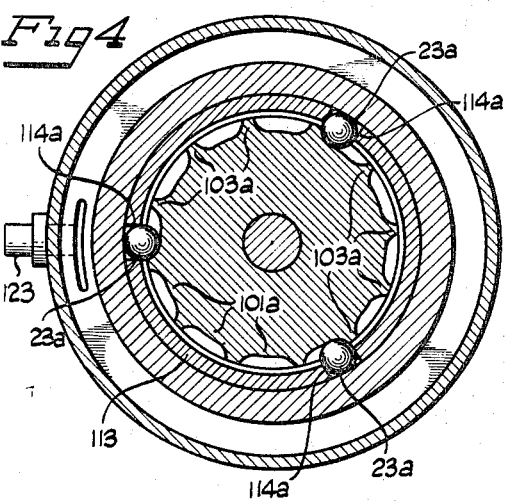
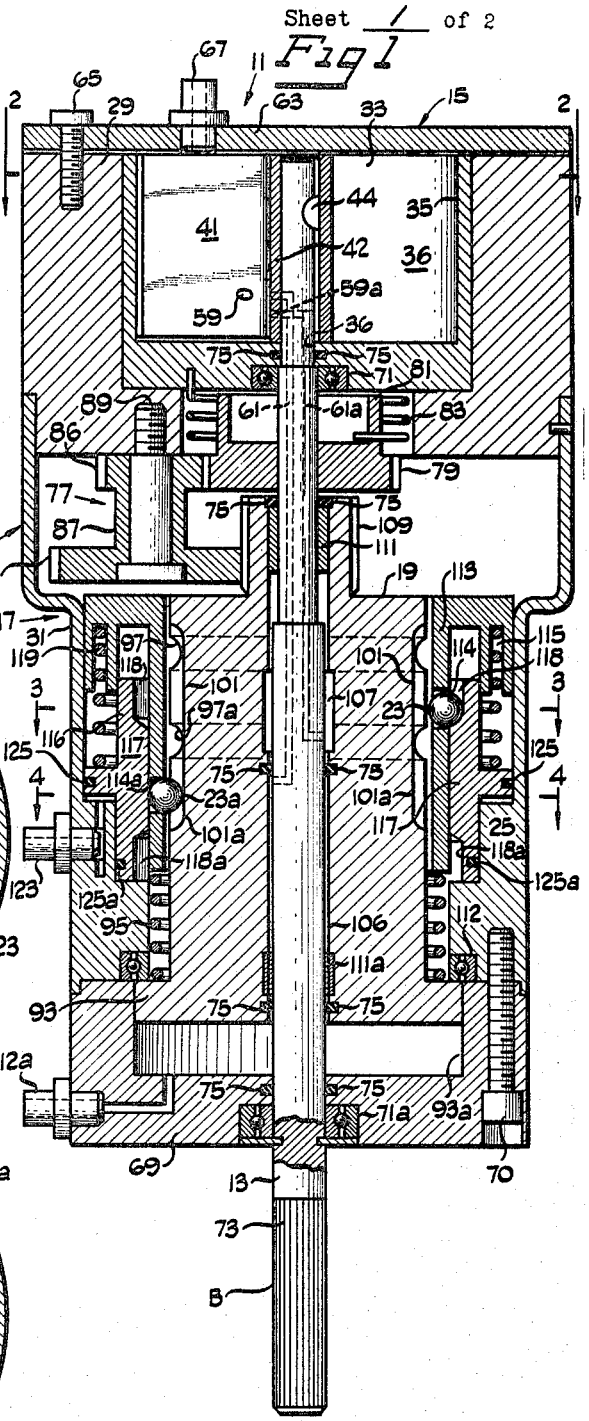
INVENTOR
JOHN C. BASS
BY Anderson, Luedeka, Fitch, Even & Tabin
ATTORNEYS

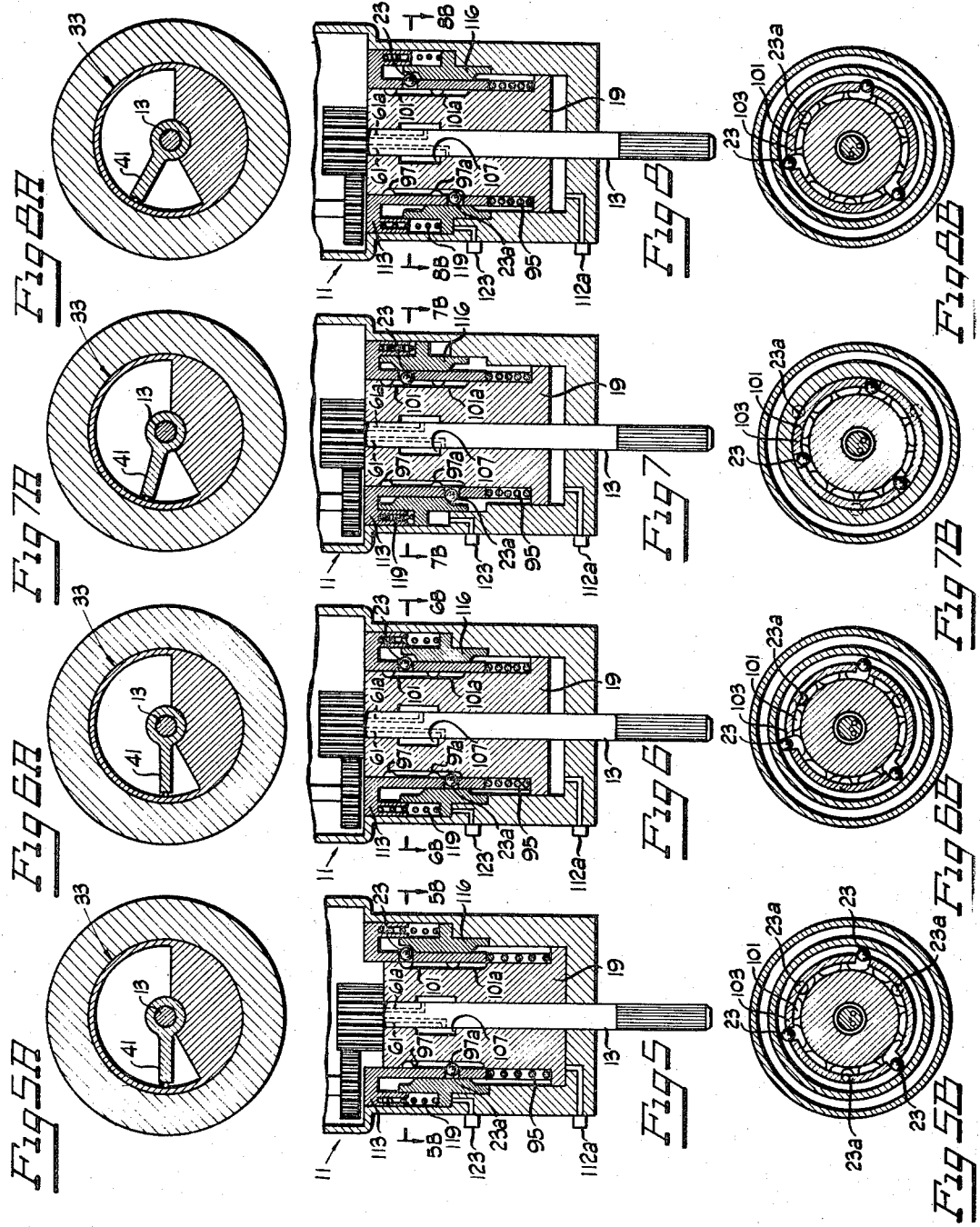

United States Patent Office 3,429,203
Patented Feb. 25, 1969

3,429,203
HYDRAULIC REACTOR CONTROL DRUM DRIVE
John C. Bass, Cardiff, Calif., assignor, by mesne assignments, to Gulf General Atomic Incorporated, San Diego, Calif., a corporation of Delaware
Filed Sept. 20, 1965, Ser. No. 488,449
U.S. Cl. 74—822       16 Claims
Int. Cl. B23b 29/24; G05g 5/06

ABSTRACT OF THE DISCLOSURE

A drive mechanism incorporates an indexing means. The indexing means provides for incremental rotation of a drive shaft and, in addition, for free rotation thereof, depending upon selective operation of locking means.

---

This invention generally relates to a drive mechanism for a control drum of a nuclear reactor and, more particularly, it relates to a hydraulically operated control drum drive mechanism having means for incremental control thereof.

To regulate the operation of a nuclear reactor and to reduce the reactor output rapidly during so-called "scram" or emergency conditions, control systems of various types have been provided. One variety of control system includes a cylindrical control drum rotatable about its central axis. Such control drums are generally supported within recesses provided in the reflector shield which surrounds the reactor core. A portion of each drum, generally one side thereof, is composed of neutron reflector material and the other side, of material having high neutron absorbing properties. To operate the reactor at maximum output, the reflector side of the drum is turned toward the core of the reactor and, when it is desired to operate the reactor at minimum output, the drum is rotated one hundred and eighty degrees so as to expose the neutron absorbing material toward the reactor core.

A nuclear reactor including a version of such a control drum is described in the U.S. patent application of E. V. Haake et al., Ser. No. 396,230, filed Sept. 14, 1964, now Patent No. 3,339,184.

To maintain control over the drum position, the drive mechanism preferably includes means for positively locking the drum against further rotation after it rotates through each of a plurality of increments of its total range. A further desirable feature of the drum drive mechanism is the provision of means for rapidly exposing the absorbing segments of the control drums to the reactor core during "scram" conditions.

A main object of the present invention is to provide a novel mechanism for positioning the control drum of a nuclear reactor.

A more particular object of the present invention is to provide a novel hydraulic drive mechanism for incrementally positioning the control drum of a nuclear reactor.

Another object is to provide a compact, reliable reactor drum drive mechanism which is capable of operating under adverse radioactive conditions.

A still further object is to provide a novel reactor drum drive mechanism which includes a means of positively locking the drum in different positions through its range of rotation.

Other objects and advantages of the invention will become apparent through reference to the following description and accompanying drawings which show an illustrative embodiment of this invention, in which:

FIGURE 1 is a diametrical sectional view of a reactor drum drive mechanism embodying certain features of this invention;

FIGURE 2 is a fragmentary sectional view of the drive mechanism taken along line 2—2 of FIGURE 1;

FIGURE 3 is a sectional view of the drive mechanism taken along line 3—3 of FIGURE 1;

FIGURE 4 is a sectional view of the drive mechanism taken along line 4—4 of FIGURE 1;

FIGURE 5 is a fragmentary reduced sectional view similar to FIGURE 1 and showing the drive mechanism in its de-energized or free wheeling position;

FIGURE 5A is a sectional view of the mechanism of FIGURE 5 similar to FIGURE 2;

FIGURE 5B is a sectional view of the drive mechanism taken along line 5B—5B of FIGURE 5;

FIGURES 6, 6A and 6B are similar to FIGURES 5, 5A and 5B and illustrate the drive mechanism in a different condition;

FIGURES 7, 7A and 7B are similar to FIGURES 5, 5A and 5B and illustrate the drive mechanism in still another condition; and FIGURES 8, 8A and 8B are similar to FIGURES 5, 5A and 5B and illustrate the drive mechanism in still another different condition.

The improved drive mechanism 11 shown in the drawings for purposes of illustration controls rotational movement of a drive shaft 13 which is adapted to be coupled to a reactor control drum (not shown). Rotary motion for driving the shaft is derived from an actuating means 15 and is transmitted to the shaft through an indexing means 17 which provides for rotation of the shaft in opposite directions throughout its total range and in steps or increments of the range.

The indexing means 17 comprises a rotary indexing member 19 connected to the drive shaft for movement therewith and two sets of locking members 23 and 23a each movable into and out of an active position and operable, when shifted into its active position, to cooperate with parts 103 and 103a on the rotary member to prevent further rotation of the member after the member has turned through a limited portion of its total range. Shifting of the members into and out of their active positions is effected by a selectively operable means 25 which alternately shifts first the members 23 of one set into their active positions and then the members 23a of the other set, the rotary member advancing one step under the force of the actuating means 15 as the members of each set are shifted into their active positions.

More particularly, the actuating means 15 and the indexing mechanism 17 are enclosed within a housing 27 comprising an upper housing member 29 which receives the actuating means 15 and a cylindrical shell 31 secured to and extending below the upper member and containing the indexing mechanism 17. The actuating means 15 illustrated is a vane motor 33 having a cup-shaped casing 35 secured in a cylindrical cavity in the upper housing member and a flat vane 41 integral with and projecting radially from a cylindrical sleeve 42. This sleeve telescopes over and is keyed to the upper end of the drive shaft as indicated at 44 in FIGURES 1 and 2. The shaft extends through a centrally disposed circular opening 36 in the cup-shaped casing and is journaled in a bearing 71 supported by the casing.

The vane 41 moves within a recess 36 of generally semi-cylindrical shape in the vane motor casing 35 (FIGURE 2). The angular extent of the recess is slightly greater than 180 degrees to permit movement of the vane through 180 degrees, the remainder of the casing forming a sector 37 which limits movement of the vane.

The free end of the vane 41 is provided with a rectangular opening 45 receiving an elongated wiper 49 of resilient material and one or more coil springs 51. The latter urge the wiper 49 against the inside of the wall of the casing 35 to restrict the passage of fluid around the vane 41. To further prevent leakage of fluid around the vane 41, a second wiper 53 of similar construction is positioned in a radial opening provided in the sector 37 and is urged inwardly into engagement with the sleeve 42.

For reasons to be hereinafter stated, the sleeve 42 is provided with two radially disposed passages 59 and 59a each of which communicates with the interior recess in motor casing 35 on opposite sides of the vane 41 and with equalization passages 61 and 61a which extend downwardly through the drive shaft 13. The vane motor 33 is sealed within the upper housing member 29 by means of a cover plate 63 secured by suitable fasteners 65. Fluid is introduced into the vane motor 33 through a fluid port 67 provided in the cover plate 63. The fluid port 67 is positioned as shown in phantom in FIGURE 2 so that an increase in pressure will result in a clockwise rotation of the vane 41 and consequently the drive shaft 13 as viewed in this figure. To relieve pressure behind the vane, i.e., on the side thereof opposite the pressure port 67, during the clockwise rotation of the vane and drive shaft, a suitable port and suitable external conduits and valving (not shown) are provided.

The drive shaft 13 is coaxial with and extends downwardly through the indexing mechanism 17 and through a lower cover plate 69 secured to the shell 31 by suitable fasteners 70. The drive shaft 13 is supported for rotation within the drive mechanism 11 by the upper bearing 71 on the vane motor casing 35 and a lower bearing 71a supported by the lower cover plate 69. To facilitate coupling of the control drum (not shown) to the drive shaft 13, the lower portion B of the shaft projecting beyond the lower cover plate is ribbed. To prevent fluid leakage along the surface of the drive shaft 13, a plurality of sealing washers 75 composed of fibrous resilient material are compressed between the drive shaft 13 and various supporting parts of the drive mechanism 11 at points spaced along the shaft is illustrated in FIGURE 1.

As previously mentioned, the indexing or stepping mechanism 17 is mounted within the shell 31. To couple the indexing mechanism to the drive shaft 13, a step-down gear train 77 is provided. The gear train 77 includes a spur gear 79 which is secured to the drive shaft 13 for rotation therewith and is provided with an upwardly projecting collar 81. The gear train 77 provides a rotational speed increase between the drive shaft 13 and the indexing mechanism 17. The gear train 77 further comprises a pinion gear 86 which meshes with the spur gear 79. The pinion gear 86 is integral with a hollow shaft 87 which is journaled on a stub shaft 89 secured to and depending from the lower side of the upper housing member 29. Another spur gear 91 is formed integral with the shaft 87 for rotation with the pinion gear 86 and meshes with a pinion 109 on the rotary indexing member 19 as will be described later.

The vane 41 and gears normally are urged toward starting or de-energized positions by a torsion spring 83 wound about the collar 81 and having one end secured to the collar. The other end of the spring is secured to the lower surface of the stationary vane motor casing 35. The torsion spring 83 urges the spur gear 79 and thus the drive shaft 13 and vane 41 in a counterclockwise direction as viewed in FIGURE 2, the de-energized position of the vane being shown in this figure.

The rotary member 19 which is part of the indexing mechanism 17 is generally a cylindrical piston and includes a flange 93 projecting radially and outwardly from its lower end slidable vertically in a cylindrical bore 93a in the lower cover plate 69. A coiled return spring 95 encircling the lower end portion of the piston is compressed between the flange and an inner sleeve 113 encircling the upper end portion of the piston and urges the piston downwardly.

On the exterior of the upper end portion of the piston are formed axially spaced upper and lower circumferential grooves 97 and 97a. Located between these grooves are recesses 101 which are angularly spaced apart in a continuous circumferential row as illustrated in FIGURE 3. Alternating with the recesses 101 and separating one from the other are a plurality of tapered projections or ribs 103 which cooperate with one set of locking members 23 referred to above to control stepping of the drive shaft 13. A second circumferential row of angularly spaced recesses 101a extends around the indexing piston below the grooves 97a and these lower recesses are separated one from the other by tapered projections or ribs 103a which cooperate with the other set of locking members 23a.

The locking members 23 and 23a in this instance are balls which are movable radially into and out of the recesses 103 and 103a but are restrained against axial and circumferential movement with respect to the indexing piston 19. The balls thus are supported in apertures 114 and 114a in the stationary retaining sleeve 113 encircling the piston. When each ball is shifted inwardly into one of the associated recesses, it is in the path of the ribs so as to engage the next adjacent rib and prevent further rotation of the indexing piston.

To achieve the desired stepping action of the drive shaft 13 in response to shifting of the sets of locking balls 23 and 23a alternately into their active positions, the balls 23 of one set and their cooperating ribs 103 and recesses 101 are offset angularly with respect to the balls 23a, ribs 103a and recesses 101a of the other set. Also, each of the recesses is of greater circumferential extent than the balls. While the balls of the two sets may be aligned vertically with the recesses and ribs offset, in this instance, the ribs and recesses of one set are equal in number and are in vertical alignment with the ribs and recesses of the other set and the balls of the two sets are angularly offset as shown in FIGURES 3 and 4.

In the illustrated embodiment, the ball restraining sleeve 113 includes three upper openings 114 and three lower openings 114a equally spaced angularly about the sleeve for receiving the same number of retaining balls 23 and 23a. By virtue of the equal spacing of the openings and thus, of the balls therein, the lateral force upon the piston will be a minimum.

So that the retaining balls 23 may be selectively and alternately forced into the recesses 101 and 101a, a hollow latch piston 116 of cylindrical shape having an inwardly projecting cam or shoe 117 and an outwardly projecting radial flange is mounted for reciprocation in the cylindrical shell 31. Spaced above and below the shoe 117 are upper and lower circumferential recesses 118 and 118a positioned to receive the retaining balls when the latter are out of engagement with the detent piston 19. The latch piston 116 is downwardly biased by a compression spring 119, the lower end of which abuts the flange on the piston and the upper end of which is retained in a downwardly opening cylindrical groove 115 in a flange on the retaining sleeve 113. Pressure fluid is admitted to the shell 31 beneath the latch piston 116 through a latch piston port 123 in the wall of the shell as illustrated in FIGURE 1, and urges the piston upwardly against the action of its spring. Fluid leakage between the latch piston 116 and the shell is reduced by suitable sealing washers 125 and 125a.

The detent piston 19 is provided with a central bore 106 throughout its length. To provide communication between the equalization passages 61 and 61a when the piston 19 is in its lower or deenergized position, the bore 106 is enlarged intermediate its ends to provide an equalization port 107 connecting the lower ends of the passages. The lower ends of the passages and the port are oriented axially so that, when the piston is raised by pressure fluid to its upper position shown in FIGURE 1, the lower end of one passage 61 is below a seal 75 below the port and no longer communicates with the other passage.

Integral with the detent piston 19 and extending upwardly from the upper surface thereof is a collar 109 having gear teeth thereupon which mesh with the teeth of the wheel gear 91 in all axial positions of the piston. To maintain the coaxial relation of the drive shaft 13 and the detent piston during operation of the drive mechanism 11, upper and lower sleeve bearings 111 and 111a are inserted between these ports at the end portions of the piston bore 106.

To reduce friction on the detent piston 19 when in its uppermost position, upward movement of the piston is limited by the inner race of a ball bearing 112 whose outer race is clamped between the lower end of the shell 31 and the upper edge of a cylindrical flange on lower cover plate 69. Pressure fluid is admitted through a fluid port 112a in the lower cover plate 69 and into the bore 93a behind the piston so as to raise the piston against the action of its return spring.

The sequence of operation of the drum drive mechanism 11 is illustrated in FIGURES 5 through 8, inclusive. FIGURES 5, 5A and 5B illustrate the drive mechanism in its de-energized position in which the detent piston 19 is freely rotatable with the vane 41 of the motor 33 and the drive shaft 13. In this lowermost position, the detent piston 19 is biased downwardly by the spring 95. Also, the equalization passages 61 and 61a are communicating through the equalization port 107. Thus, the pressure differential across the vane 41 is equalized and the vane 41, the drive 13 and the indexing means 17 are rotated to their counterclockwise position by the torsion spring 83. As illustrated in FIGURE 5, the latch piston is biased downwardly by the latch piston spring 119. In this position, the three lower retaining balls 23a are forced into the lower circumferential groove 97a by the shoe 117 and the three upper retaining balls 23 are free to move radially between the upper recess 18 of the latch piston and the upper circumferential groove of the detent piston as illustrated in FIGURE 5B.

The mechanism 11 is energized by forcing fluid through the detent piston port 112a, thereby raising the detent piston as illustrated in FIGURE 6. A particular feature of this preferred embodiment is that such operation may be effected by the working fluid of the reactor, which may be in the order of fifteen pounds per square inch.

When the detent piston is upwardly positioned as illustrated in FIGURE 6, the equalization port 107 moves above the lower end of one equailzation passage 61 and communication between the passages thereby is interrupted. The retaining balls 23 and 23a within the openings of the retaining ball sleeve 113 are in registry with the circumferential recesses 101 and 101a on the outside of the detent piston 19. The lower balls 23a are forced by the latch piston shoe 117 into the recesses 101a while the upper balls are free to shift outwardly into the recess 118 above the shoe because the latch piston is in its lower position. When the parts are in these positions and fluid is introduced into the drive mechanism 11 through the vane motor port 67, a clockwise rotational force is applied to the vane 41. Since drive shaft 13 is coupled by means of the gear train 77 to the detent piston 19 which is locked in position by the lower retaining balls 23a wedged in the recesses 101a, rotation of the drive shaft 13 and the vane 41 is prevented. The force to which the indexing mechanism 17 is subjected is greatly reduced by the 4 to 1 ratio provided by the gear train 77.

To advance the mechanism 11 to a successive rotary position as illustrated in FIGURES 7, 7A and 7B, fluid is introduced into the mechanism through the latch piston port 123, thereby driving the latch piston 116 upwardly. As the latch piston rises, the shoe 117 forces the upper retaining balls 23 into the upper recesses 101. Further, as the latch piston rises within the mechanism, the lower latch piston recess 118a is brought into registry with the lower retaining balls 23a which then are free to shift outwardly and out of the lower vertical recesses 101a. The detent piston 19 and the vane then are free to rotate until the upper projections 103 between the recesses 101 engage the retaining balls 23 to thereby prevent further rotation of the mechanism 11. The circumferential extent of the recesses determine the extent of rotation of the piston.

The mechanism 11 of the illustrated embodiment provides a piston rotation of 15 degrees in each increment. However, due to the gear train 77, the drive shaft 13 is permitted to rotate only 3¾ degrees in a clockwise motion in each increment. While the angular rotation of the vane 41 has been exaggerated in FIGURE 7A, the vane has actually moved 3¾ degrees in a clockwise rotation from the position illustrated in FIGURE 6A. The gear ratio being 4 to 1, the detent piston 19 will rotate through two complete revolutions for the maximum of 180 degrees rotation of the drive shaft 13.

To rotate the drive shaft 13 to the next successive position, the fluid pressure is released from below the latch piston 116 and the piston is moved downwardly by the spring 119, to the position illustrated in FIGURE 8. As the latch piston moves downwardly, the lower retaining balls 23a are forced into the lower circumferential recesses 111a, and the upper detent piston recess 118 is in registry with the upper retaining balls 23 so that these are free to shift out of the upper piston recesses 101. The vane 41 and drive shaft 13 then rotate in a clockwise direction and the upper retaining balls 23 are forced by the projections 103 into the upper latch piston recess 118. The detent piston 19 rotates 15 degrees in a clockwise direction, which results in the drive shaft 13 rotating 3¾ degrees in a clockwise motion.

By alternately introducing fluid pressure through the latch piston port 123 and releasing it therefrom, the drive shaft 13 is caused to move in 3¾ degree clockwise rotational steps until complete 180 degree rotation of the drive shaft is accomplished. Forty-eight incremental steps are thus provided. If desired, the detent piston may be coupled directly to the drive shaft. However, the incorporation of a gear train permits smaller incremental movement and yet permits the use of relatively large balls and ball recesses. Further, as previously mentioned, the gear train minimizes the stress to which the indexing mechanism is subjected.

To reverse the movement of the drive shaft 13, the pressure is released from the vane motor 33 through the vane motor port 67. The torsion spring 83 exerts a force on the vane 41, moving the vane and the drive shaft counterclockwise through one increment. The detent piston rotates 15 degrees counterclockwise until further rotation is prevented by the projections 103. To permit advance of the drive shaft in a counterclockwise direction, the latch piston is reciprocated in a manner previously discussed in the preceding paragraph.

To return the drive shaft rapidly to its de-energized position which may correspond to minimum moderation of the reactor as would be desirable during "scram" conditions, the fluid pressure is released from below the detent piston 19, and the detent piston is forced downwardly by the spring 95. When the detent piston 19 is in this lowermost position, the equalization passages 61 and 61a communicate through the equalization grooves 107, thereby equalizing the pressure across the vane 43. Further, as the detent piston drops, the retaining balls are aligned with the circumferential grooves 97 and 97a. Thus, the detent piston 19 is permitted to rotate freely with the drive shaft and the vane motor, which are driven counterclockwise to the de-energized position under the influence of the torsion spring 83. If desired, the size of the equalization port 107 may be varied to reduce the speed at which the vane is rotated by the torsion spring. The most desirable size is that which provides fastest movement of the drive shaft yet does not introduce a great shock to the system.

The illustrated embodiment is capable of providing incremental stepping for positioning the control drum of a nuclear reactor and is capable of rapidly moving the control drum to its minimum moderating position during "scram" conditions.

What is claimed is:

1. A drive mechanism comprising a drive shaft, an actuating means coupled to said drive shaft and operable to apply a force tending to turn the shaft, and an indexing means coupled to said actuating means, said indexing means including a plurality of first locking members distributed circumferentially about said drive shaft and rotatable therewith, a plurality of sets of second locking members movable relative to and into and out of active positions of locking engagement with said first locking members to restrict the rotary movement of said drive shaft, said sets of second locking members being staggered circumferentially with respect to said first locking members, and selectively operable means for shifting said sets of said second locking members alternately into and out of said active positions to permit incremental movements of said drive shaft under the action of said actuating means.

2. A mechanism according to claim 1 wherein said selectively operable means comprise a latch member movable axially with respect to said drive shaft.

3. A mechanism according to claim 1 wherein said first locking members are supported on a rotatably mounted member coupled to said drive shaft for rotation therewith, and wherein said rotatably mounted member is selectively shiftable with respect to said sets of said second locking members to a position wherein said shaft is free to rotate without engagement of said locking members.

4. A rotary drive mechanism comprising, a drive shaft, an actuating means coupled to said drive shaft and applying a turning force thereto, and a selectively operable indexing means coupled to said actuating means, said indexing means including a rotatably mounted member the outer surface of which is provided with a plurality of angularly spaced recesses separated by a plurality of projections, a plurality of retaining balls movable into and out of said recesses and, when in said recesses, engaging said projections to restrict the rotary movement of said rotatably mounted member, and selectively operable means to position said balls in said recesses.

5. A rotary drive mechanism comprising, a drive shaft, an actuating means coupled to said drive shaft and imparting a rotary driving force thereto, and a selectively operable indexing means coupled to said shaft to permit incremental rotation thereof under the action of said activating means, said indexing means including a cylindrical member mounted for rotation about its central axis and having on its exterior surface a plurality of angularly spaced recesses separated by spaced projections and arranged in axially spaced rows, a plurality of second members arranged in two sets, one for each of said rows, and movable into and out of active positions within the associated ones of said recesses and, when within the recesses, engaging said projections to restrict rotary movement of said cylindrical member, and means selectively operable alternately to shift first said second members of one of said sets and then the second members of the other set into said active positions, cooperating parts of one of said sets and its associated recesses being angularly offset relative to cooperating parts of the other set and its recesses thereby to permit incremental rotary stepping movement of said shaft in response to alternate shifting of the sets into said active positions.

6. A rotary drive mechanism comprising, a drive shaft, an actuating means coupled to said drive shaft and imparting a rotary driving force thereto, and a selectively operable indexing means coupled to said drive shaft to permit incremental rotational operation thereof under the action of said actuating means, said indexing means including a rotary member, a stationary member positioned adjacent said rotary member, a first set of first and second members with said first members mounted on said rotary member and said second members retained in circumferentially fixed positions by said stationary member and with said second members movable relative to said first members and into and out of engagement therewith, a second set of first and second members with the first members thereof mounted upon said rotary member and the second members thereof positioned by the stationary member and movable radially of the rotary member relative to the first members and into and out of engagement therewith, some of the members of said first set being offset circumferentially from some of the members of said second set, and means for selectively shifting said first members of each of said sets with respect to the second members and into and out of positions of engagement therewith.

7. A rotary drive mechanism comprising a drive shaft, first actuating means coupled to said drive shaft to impart rotary motion thereto and an indexing means coupled to said first actuating means to permit incremental operation thereof, said indexing means including a cylindrical member mounted for rotation about its central axis and having a plurality of circumferentially spaced recesses on its outer surface, a retaining sleeve surrounding and coaxial with said cylindrical member and having a plurality of openings adjacent said recesses, a plurality of second members maintained within said openings, and second actuating means for moving said second members selectively into and out of said recesses, said second members operating when within said recesses to restrict the rotary movement of said cylindrical member.

8. A rotary drive mechanism comprising, a drive shaft, first actuating means coupled to said drive shaft to impart rotary motion thereto, and a selective indexing means coupled to said first actuating means to provide incremental operation thereof, said indexing means including a cylindrical member mounted for rotation about its central axis, the outer surface of said cylindrical member being provided with a plurality of circumferentially spaced recesses, a cylindrical sleeve surrounding and coaxial with said cylindrical member and having a plurality of circular openings, retaining balls maintained within said circular openings, and second actuating means for moving said retaining balls radially of said sleeve to seat within said recesses so that when said balls are seated, the rotary movement of said drive shaft is restricted.

9. A rotary drive mechanism comprising a drive shaft, an actuating means coupled to said drive shaft to impart rotary motion thereto, and an indexing means coupled to said actuating means to permit incremental operation thereof, said indexing means including a cylindrical member mounted for rotation about its central axis and having a plurality of recesses on its outer surface separated by projections, a cylindrical sleeve surrounding and coaxial with said cylindrical member and having a plurality of circular openings, a plurality of balls retained within said circular openings and shiftable radially to active positions partially within said recesses and partially within the openings and operable, when in said active positions, to engage said projections to limit rotation of said member, and a hollow cylindrical latch surrounding and coaxial with said cylindrical member and shiftable axially into and out of cooperative engagement with said retaining balls so that, when said latch is shifted into engagement with the balls, the balls are shifted into said active positions.

10. A rotary drive mechanism comprising a drive shaft, an actuating means coupled to said drive shaft to impart rotary motion thereto, and an indexing means coupled to said actuating means to permit incremental operation thereof, said indexing means including a cylindrical member mounted for rotation about its central axis and having a plurality of recesses upon its outer surface, a cylindrical sleeve surrounding and coaxial with said cylindrical member and having a plurality of circular openings registering with said recesses, a plurality of retaining balls maintained within said circular openings and movable radially into and out of active positions in said recesses, said balls, when in said active positions, restricting rotary movement of said cylindrical member, a spring biased cylindrical latch piston slidably surrounding and coaxial with said sleeve and having a cam portion for engagement with said balls to shift said balls inwardly to active positions within said recesses and means for applying a fluid pressure to said latch piston to move the piston against its spring bias and said cam portion into engagement with said balls to shift the same into said active position.

11. A drive mechanism comprising a drive part mounted to rotate between limits, an actuating means coupled to said drive part and operable to apply a force tending to turn the part, and an indexing means coupled to said part an dincluding a member movable between a first position in which the part is rotatable in limited increments between said limits and a second position in which the part is free to rotate without restriction between the limits, and a selectively operable means for shifting said member between said positions.

12. A drive mechanism comprising a drive shaft, an actuating means coupled to said drive shaft and operable to apply a force tending to turn the shaft, and an indexing means coupled to said actuating means for stepping movement thereof, said indexing means including a first member mounted for rotating movement, a second member cooperating with said first member to control said rotary movement thereof and operable to permit incremental rotary movement when the members are in first positions relative to each other and to permit unrestricted rotary movement of the first member when the members are in different relative positions, and a selectively operable means for effecting relative movement of said first and second members between said first and different relative positions.

13. A rotary drive mechanism comprising a drive shaft, an actuating means coupled to said drive shaft to impart rotary motion thereto, a cylindrical member mounted for rotation about its central axis and mounted for axial displacement, said cylindrical member having a plurality of recesses upon its outer surface and at least one circumferential groove extending about its outer surface and communicating with said recesses, a fixed cylindrical sleeve surrounding and coaxial with said cylindrical member and having a plurality of openings registering with said recesses, a plurality of retaining balls maintained within said circular openings and movable radially into and out of active positions within said recesses, said balls restricting rotary movement of said cylindrical member when in said active positions, selectively operable means engageable with said balls to shift the balls inwardly into said active positions, and selectively operable means for axially displacing said cylindrical member so as to shift said groove into and out of registration with said balls, said cylindrical member being freely rotatable when said groove registers with said balls.

14. A rotary drive mechanism comprising a drive shaft, an actuating means coupled to said drive shaft to impart rotary motion thereto, a cylindrical member mounted for rotation about its axis and having a plurality of recesses upon its outer surface and at least one circumferential groove extending around its outer surface and communicating with said recesses, a ball retaining member coaxial with said cylindrical member and having a plurality of openings registering with said recesses, a plurality of retaining balls maintained within said openings and movable radially into and out of active positions in said recesses, said balls restricting movement of said cylindrical memeber when in said active positions, selectively operable means engageable with said balls to shift the balls inwardly to said active positions, and selectively operable means for axially displacing one of said members relative to the other member to bring said balls and groove into registry with each other to permit free rotation of said cylindrical member.

15. A rotary drive mechanism comprising a drive shaft, an actuating means coupled to said drive shaft to impart rotary motion thereto, a cylindrical member mounted for rotation about its central axis and mounted for axial displacement, said cylindrical member having a plurality of recesses upon its outer surface and at least one circumferential groove extending about its outer surface and communicating with said recesses, a ball retaining member coaxial with said cylindrical member and having a plurality of openings registering with said recesses, a plurality of retaining balls maintained within said openings and movable radially into and out of active positions within said recesses, said balls restricting rotary movement of said cylindrical member when the balls are in said active positions, a latch member slidably surrounding and coaxial with said sleeve and having a cam portion engageable with said balls to shift said balls inwardly to said active positions, selectively operable means for shifting said latch member axially, and other selectively operable means for axially displacing said cylindrical member so as to shift said grooves into and out of registration with said balls to permit free rotation of the cylindrical member.

16. A rotary drive mechanism comprising a drive shaft, an actuating means coupled to said drive shaft to impart rotary motion thereto, a cylindrical member mounted for rotation about its central axis and having a plurality of recesses upon its outer surface and at least one circumferential groove about its outer surface, a ball retaining member coaxial with said cylindrical member and having a plurality of openings registering with said recesses, a plurality of retaining balls maintained within said openings and movable radially into and out of active positions within said recesses to restrict rotary movement of said cylindrical member, a latch member having a cam portion and selectively movable to bring the cam portion into engagement with said balls to shift the balls inwardly to said active positions, said cylindrical member and said ball retaining member being shiftable relative to each other to bring said groove and said balls into registration with each other thereby permitting said cylindrical member to rotate freely.

References Cited
UNITED STATES PATENTS

| | | | |
|---|---|---|---|
| 2,638,015 | 5/1953 | Schoelles | 74—527 X |
| 3,290,960 | 12/1966 | McCay | 74—527 |

MILTON KAUFMAN, *Primary Examiner.*

U.S. Cl. X.R.

74—527